Patented Jan. 7, 1936

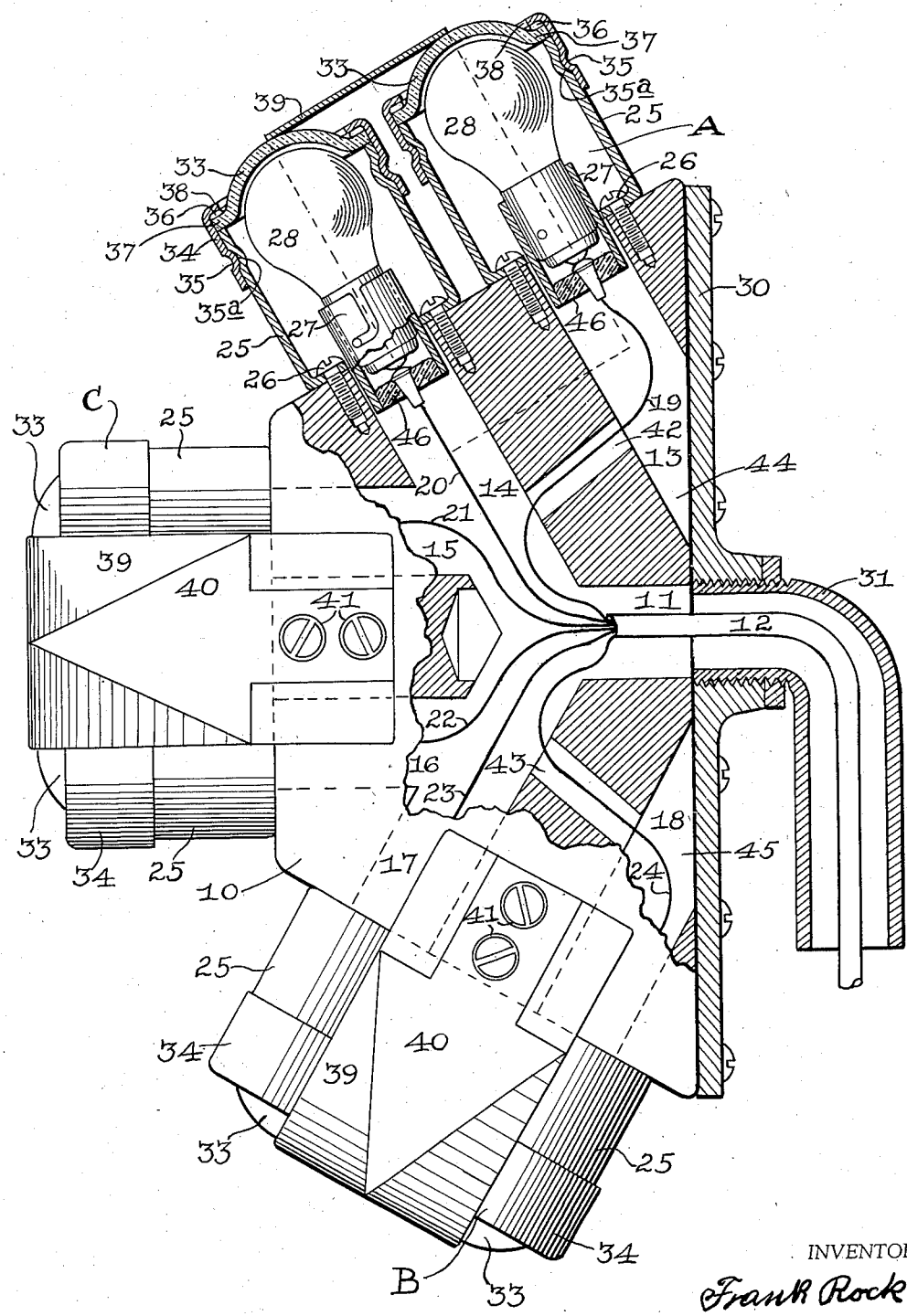

2,026,752

UNITED STATES PATENT OFFICE 2,026,752

MOTOR VEHICLE SIGNAL

Frank Rock, Los Angeles, Calif.

Application June 1, 1935, Serial No. 24,519

3 Claims. (Cl. 177—329)

This invention relates to signal devices for self propelled vehicles and more particularly to an electric turn or stop intention-indicator for automobiles.

A principal object of the invention is to provide a signaling device suitable for installation on a front pillar of the driver's cab of a motor vehicle and particularly on the driver's side, in which position the device will substitute, particularly at night, for the customary hand signaling on the part of the driver.

A further object of the invention is to provide a motor vehicle turn and stop intention-indicator which will have the combined utility of signaling an intention to turn to the right, or to the left or to stop, and which will singularly distinguish in each signaling respect from other lighted motor vehicle devices such as the conventional stop warning lights which are usually placed in close proximity with, or form as a combination of, the conventional tail light. In the obtaining of this singular distinguishing virtue this invention features a separate lighting unit to indicate each the intention to turn to the right, the intention to turn to the left and the intention to stop. Aside from the provision of a separate lighting unit to indicate each respective intention to turn either way and to stop, the invention features a plurality (preferably two) of light spots of each respective signaling lighting unit with the objective of attracting both quicker attention from other drivers and to facilitate the signal being seen at night from a much greater distance than would be the effect of a single spot of light.

Another object of the invention is to provide a turn and stop intention-indicating signal for motor vehicles particularly suited for mounting on the front pillar of the vehicle body, in which location drivers of vehicles are accustomed to watching for signals from another vehicle, and which invention features a novel arrangement of separate lighting right turn, left turn and stop indicator units, of a single signaling instrument, but of respective signaling lighting units being arranged in top, outward and bottom positions relative to the pillar of the driver's cab, respectively for indicating right turn, left turn and stop intentions. By which novel form and arrangement of three different signaling lighting units the customary raised hand, outward hand and downward hand signals on the part of the driver are correspondingly substituted by the various separate lighting units respectively accordingly arranged. In the obtaining of this feature the present invention contemplates the provision of a block having three angularly diverging outward sides, or an outward side and angularly diverging top and bottom surfaces, and with a separate lighting unit situated on each of the three diverging outward surfaces by which the customary raised, lowered and outward extended hand signals are substituted by separate lighting indicators having similar high, low and outward positions.

A further object of the invention and more particularly in connection with the provision of a plurality of light spots to indicate each of several driver-intentions is the provision of at least two separate light globes constituting each lighting effect of a given separate signaling unit of the plurality of signaling units and to separate the lighting effect of the plurality of light globes of a given signaling unit. In the obtaining of this separated or multiplicity of light spots of a given signaling unit the invention contemplates the provision of a blank forming a hood over the plurality of lights of a given unit and upon which blank or hood the invention further contemplates the provision of arrows, of the upper signaling unit pointing upward, of the lower signaling unit pointing downward and of the central signaling unit pointing outward, respectively, to add to the respective indicating effectiveness of the signal.

A still further object of the invention is to provide each light globe unit of the plurality of a given signaling unit in the form of a cup or cylinder accommodating the separate globe units, open at the outer end for both light projection and to facilitate replacing the globe. Aside from this, each globe unit receptacle having a preferably snapped-on cap to facilitate easy disassembling of the light globe unit.

The drawing is a vertical view partly in elevation and partly in section showing the preferred construction of the invention.

With reference to the drawing, 10 indicates a base block, preferably metal, and having a main inlet 11 for a cable 12 and leading into six branch ducts 13, 14, 15, 16, 17 and 18, respectively, accommodating the separate circuits 19, 20, 21, 22, 23 and 24 which emanate from the cable 12. Each of these ducts 13, 14, 15, 16, 17 and 18 open through the outer surfaces of the block 10.

A metal receptacle 25 is fitted preferably by screws 26 to the block 10 centrally over each of the branch duct openings 13, 14, 15, 16, 17 and 18. This receptacle 25 has a hole through its end juxtaposed relative to the opening of the respective associate duct and which hole permits of a globe socket 27 being pressed tightly and preferably soldered to the receptacle 25. The socket 27 over each of the branch ducts is adapted to receive a globe or light bulb 28. The block 10 being of metal and mounted upon the steel body pillar 29 of the vehicle, by any suitable means but a preferred form of which comprises a plate 30 secured to the straight side of the block 10 and covering the back openings of the branch ducts, a pipe 31 threaded into the plate 30 and a clamp 32 secured to the pillar 29 of the vehicle, provides a ground for all the separate globes in connection with the provision of the individual circuits 19, 20, 21, 22, 23 and 24.

A glass dome 33 is fitted over the outer end of each of receptacles 25 and is held in place preferably by a cap 34 having dentates 35 which are adapted to register or snap into corresponding recesses 35a formed in the receptacle 25. To seal the chamber of the receptacle housing the light globes against the elements a gasket 36 is inserted between the flange portion 37 of the dome 33 and the flange portion 38 of the cap 34.

A band or hood 39 is arranged to cover the contiguous sides of the light chamber domes 33 of each signal unit of twin globes formed coincident with a given one of the three angularly diverging outer surfaces of the block 10. This band or blank 39 serves to both effectively separate the light projection from a multiple globe respective signal unit into a dual light and to provide a surface on which to provide an arrow 40 with each respective signal unit. Preferably the arrow 40 is painted or enameled on the band 39. Screws 41 serve to detachably secure the band 39 to the block 10.

Preferably the two upwardly diverging branch ducts 13 and 14 and the two downwardly diverging branch ducts 17 and 18, respectively, are connected by tunnels 42 and 43 which permit of the circuits 19, 20, 21, 22, 23 and 24 all being disposed through the one inlet 11 of the block instead of some through the inner openings 44 and 45 of the ducts 13 and 18.

An insulation 46 is fitted into the inner end of each of the globe sockets and through which the respective globe circuit line extends into contact with the respective globe.

Thus it will be seen that I have provided a useful and simple singularly devised combination of elements, forms and arrangements making up a simple and inexpensive and highly advantageous signaling device particularly suited for use on motor vehicles, but adaptable to general use.

I claim:

1. In an electric signal and in combination, an electric light signaling unit comprising a pair of cylindrical receptacles, a socket protruding through one end of each of said pair of receptacles, an electric light bulb fitted in each of said sockets, said receptacles being open at their opposite ends, a separate glass dome covering said open end of each of said receptacles, means detachably securing said domes to their respective associate receptacle, a hood covering contiguous portions only of the said domes of both said pair of said receptacles and leaving the remote portions of the said domes of said pair of receptacles uncovered.

2. The invention as claimed in claim 1 together with an arrow provided on said hood pointing in the direction of a line running from said sockets to said domes of said pair of receptacles.

3. A vehicle signal device comprising a signal unit made up of a pair of electric lamp bulb non-light penetrating receptacles arranged side by side and an electric lamp bulb in each said receptacle and a separate light penetrating dome covering the same light projecting end of each of said pair of receptacles and a non-light penetrating cover over contiguous sides of said domes of said pair of receptacles adapted to cause the light projections through said domes from said pair of lamp receptacles to project as separate light beams.

FRANK ROCK.